United States Patent [19]
Fukasawa et al.

[11] Patent Number: 6,136,902
[45] Date of Patent: *Oct. 24, 2000

[54] POLYACETAL RESIN COMPOSITIONS COMPRISING BORIC ACID

[75] Inventors: Yoshihito Fukasawa; Sachio Anada, both of Shizuoka, Japan

[73] Assignee: Polyplastics Co., Ltd., Japan

[ * ] Notice: This patent is subject to a terminal disclaimer.

[21] Appl. No.: 08/878,000

[22] Filed: Jun. 18, 1997

[30] Foreign Application Priority Data

Jun. 19, 1996 [JP] Japan ................................ 8-158344

[51] Int. Cl.[7] ............................ C08K 13/02; C08L 59/00
[52] U.S. Cl. ........................... 524/128; 524/130; 524/132; 524/141; 524/151; 524/152; 524/153; 524/248; 524/291; 524/342; 524/343; 524/345; 524/348; 524/349; 524/351; 524/352; 524/404; 524/405; 206/387.1; 360/104; 360/110; 360/134
[58] Field of Search .................................... 524/141, 248, 524/291, 342, 343, 345, 348, 349, 351, 352, 404, 405, 128, 130, 132, 151, 152, 153; 206/387.1; 360/104, 110, 134

[56] References Cited

U.S. PATENT DOCUMENTS 3,219,727  11/1965  Kray et al. .............................. 260/874
4,652,594  3/1987  Auerbach et al. ....................... 523/208
4,744,934  5/1988  Christy .................................... 264/101
5,137,958  8/1992  Matsunami et al. .................... 524/405

FOREIGN PATENT DOCUMENTS 0 450 630 A1  10/1991  European Pat. Off. .
64-12030  9/1982  Japan .
7-262400  10/1995  Japan .
WO 89/09805  10/1989  WIPO .

OTHER PUBLICATIONS

J50151952 A polyacetal compsn. Prepd. Contg. a fatty acid boric acid glycerol ester (1985).

*Primary Examiner*—Frederick Krass
*Attorney, Agent, or Firm*—Nixon & Vanderhye P.C.

[57] ABSTRACT

To provide a polyacetal resin composition having an excellent corrosion inhibiting effect on metals, particularly reduced in the adverse effect on magnetic tapes or the like, and suitable for use in producing component parts of a magnetic tape cassette such as a reel hub or tape guide, 100 parts by weight of a polyacetal resin (A) is blended with 0.05 to 5 parts by weight of an antioxidant (B), 0.001 to 5 parts by weight of a specified nitrogen-containing compound (C), and 0.001 to 3 parts by weight of a boric acid compound.

7 Claims, No Drawings

POLYACETAL RESIN COMPOSITIONS COMPRISING BORIC ACID

FIELD OF THE INVENTION

The present invention relates to a polyacetal resin composition having an excellent corrosion inhibiting effect on metals, more specifically to a polyacetal resin composition having an excellent corrosion inhibiting effect on magnetic materials used for a magnetic tape.

DESCRIPTION OF THE RELATED ART

Magnetic tapes obtained by forming ferromagnetic layers comprising principally Fe, Co, Ni or an alloy thereof on a film of polyester or the like by vacuum deposition, ion plating or sputtering are used as an audio tape and a VTR tape. In recent years, magnetic tapes are widely used as a recording medium of a digital recording system since they are suited to high density recording. Exposure of magnetic tapes to an environment of high temperatures and high humidity causes corrosion on the surface of a ferromagnetic layer to lower the electromagnetic conversion characteristics and bring about troubles in practical use.

A magnetic tape is used storing in a cassette. It is known that corrosion is accelerated by component parts of the cassette, and it is confirmed that in particular, polyacetal which is used for a reel hub or a tape guide in many cases promotes the corrosion. It is considered that the corrosion is caused by adhesion of formaldehyde resulting from polyacetal or formic acid which is an oxide thereof on the surface of the tape. A method for improving this problem is disclosed in JP-B-64-12030, wherein a polyacetal resin-molded article is dried at 100° C. for a week in an atmospheric environment or dried at 100° C. for one hour under a reduced pressure of 0.01 Torr to decrease the amount of formaldehyde contained in the resin-molded article.

Further, a method for specifically controlling the amount of formaldehyde resulting from a polyacetal resin to a specific amount or less is proposed in JP-A-7-252400, in which molecular terminals are stabilized after polymerization, and then the resin is further passed through an extruder comprising at least two steps including a deaeration step. However, either method is not practically useful in terms of time or facilities.

SUMMARY OF THE INVENTION

Taking the problem described above into consideration, the present inventors have intensively investigated in order to obtain a polyacetal resin composition having an excellent corrosion inhibiting effect on metals such as a magnetic material, and as a result thereof, they have come to complete the present invention.

That is, the present invention relates to a polyacetal resin composition having an excellent corrosion inhibiting effect on metals, which comprises:

(A) 100 parts by weight of a polyacetal resin,
(B) 0.05 to 5 parts by weight of an antioxidant,
(C) 0.001 to 5 parts by weight of at least one nitrogen-containing compound selected from among melamine, derivatives thereof, a melamine-formaldehyde resin, polyamides and polyacrylamides, and
(D) 0.001 to 3 parts by weight of a boric acid compound.

DETAILED DESCRIPTION OF THE INVENTION

The constitutional components of the resin composition according to the present invention shall be explained below in detail.

The polyacetal resin (A) used in the present invention is a high molecular compound comprising an oxymethylene group ($—CH_2O—$) as a principal structural unit, and preferred is a polyacetal copolymer (for example, Duracon manufactured by Polyplastics Co., Ltd.) containing small amounts of other structural units in addition to the oxymethylene group. In particular, a polyacetal copolymer obtained by copolymerizing a comonomer component of 0.5 to 30% by weight, preferably 0.5 to 10% by weight is preferred since the excellent heat stability, mechanical strength or the like can be maintained. The polyacetal copolymer may have a branched or cross-linked structure as well as a linear structure. The comonomer component used for producing the polyacetal copolymer shall not specifically be restricted, and in general, a compound having the following formula is used:

Chemical formula 1

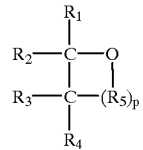

wherein $R_1$, $R_2$, $R_3$ and $R_4$ are substituents which may be the same or different and each represent a hydrogen atom, an alkyl group (having 1 to 5 carbon atoms and containing halogen atoms substituting for 0 to 3 hydrogen atoms; hereinafter, the same shall apply) or a halogen-substituted alkyl group; and $R_5$ represents a methylene group, an oxymethylene group, a methylene group or oxymethylene group substituted with an alkyl group (in this case, p is an integer of 0 to 3), or a divalent group (in this case, p is 1) represented by $—(CH_2)_q—OCH_2—$ (q is an integer of 1 to 4) or $—(O—CH_2CH_2)_n—OCH_2—$ (n is an integer of 1 to 4).

The comonomer described above includes, for example, ethylene oxide, epichlorohydrin, 1,3-dioxolane, diethylene glycol formal, 1,4-butandiol formal, 1,3-dioxane and propylene oxide.

Next, the antioxidant (B) used in the present invention is used in an amount falling in a range of 0.05 to 5 parts by weight, preferably 0.05 to 2 parts by weight per 100 parts by weight of the polyacetal resin. The amount of less than 0.05 part by weight lowers the metal corrosion inhibiting effect, and the amount exceeding 5 parts by weight causes the added substances to bleed out and stick to a magnetic tape. Accordingly, both amounts are not preferred.

The antioxidant includes the following compounds. That is, hindered phenol antioxidants include 2,2'-methylenebis (4-methyl-6-t-butylphenol), 1,6-hexanediol bis[3-(3,5-di-t-butyl-4-hydroxyphenyl)propionate], pentaerythritol tetrakis [3-(3,5-di-t-butyl-4-hydroxyphenyl)propionate], triethylene glycol bis[3-(3-t-butyl-5-methyl-4-hydroxyphenyl) propionate], 1,3,5-trimethyl-2,4,6-tris(3,5-di-t-butyl-4-hydroxybenzyl)benzene, n-octadecyl-3-(4'-hydroxy-3',5'-di-t-butylphenyl)propionate, 4,4'-methylenebis(2,6-di-t-butylphenol), 4,4'-butylidenebis(3-methyl-6-t-butylphenol), distearyl-3,5-di-t-butyl-4-hydroxybenzyl phosphonate, 2-t-butyl-6-(3-t-butyl-5-methyl-2-hydroxybenzyl)-4-methylphenyl acrylate, and N,N'-hexamethylenebis(3,5-di-t-butyl-4-hydroxy-hydrocinnamide); and phosphorus antioxidants include triphenyl phosphite, trisnonylphenyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris(2-t-phenylphenyl) phosphite, tris[2-(1,1-dimethylpropyl)- phenyl] phosphite, tris[2,4-(1,1-dimethylpropyl)-phenyl] phosphite, tris(2-cyclohexylphenyl) phosphite, and tris(2-t-butyl-4-phenylphenyl) phosphite. In addition to the above, any antioxidants such as hindered amines can be used. At least one of them or two or more kinds thereof can be used. Among them, particularly preferred compounds are 1,6-hexanediol bis[3-(3,5-di-t-butyl-4-hydroxyphenyl) propionate], pentaerythritol tetrakis[3-(3,5-di-t-butyl-4-hydroxyphenyl)propionate], triethylene glycol bis[3-(3-t-butyl-5-methyl-4-hydroxyphenyl)-propionate], and N,N'-hexamethylenebis(3,5-di-t-butyl-4-hydroxy-hydrocinnamide).

The nitrogen-containing compound (C) used in the present invention is used in an amount falling in a range of 0.001 to 5 parts by weight, preferably 0.01 to 2 parts by weight per 100 parts by weight of the polyacetal resin. The amount of less than 0.001 part by weight lowers the metal corrosion inhibiting effect, and the amount exceeding 5 parts by weight causes the added substances to bleed out and stick to a magnetic tape. Accordingly, both amounts are not preferred. At least one compound selected from among melamine, derivatives thereof, a melamine-formaldehyde resin, polyamides and polyacrylamides can be used as the nitrogen-containing compound.

Melamine and the derivatives thereof include melamine (2,4,6-triamino-sym-triazine), melem, melam, mellon, N-butylmelamine, N-phenylmelamine, N,N-diphenylmelamine, N,N-diallylmelamine, N,N",N"-trimethlolmelamine, benzoguanamine(2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-mercapto-sym-triazine, 2,4-dioxy-6-amino-sym-triazine (amelide), 2-oxy-4,6-diamino-sym-triazine (ameline), and N,N,N',N'-tetracyanoethylbenzoguanamine.

The melamine-formaldehyde resin is produced from melamine and formaldehyde in a mole ratio of 1:0.8 to 1:10.0, and a water insoluble melamine-formaldehyde polycondensation product is used.

Polyamides include homopolymerized or copolymerized polyamides such as nylon 12, nylon 6·10 and nylon 6·66·610, substituted polyamides having a methylol group or the like, nylon salts, and polyesteramides synthesized from caprolactam or a combination of caprolactone and caprolactam.

At least one of homopolymers of acrylamide and copolymers and cross-linked polymers thereof is used as polyacrylamide. Among them, preferred is at least one selected from among melamine, derivatives of melamine and a melamine-formaldehyde resin. Further, particularly preferably used is a melamine-formaldehyde resin which is produced from melamine and formaldehyde in a mole ratio of 1:0.8 to 1:10.0 and which is a water insoluble melamine-formaldehyde polycondensation product.

The boric acid compound (D) used in the present invention is used in an amount falling in a range of 0.001 to 3 parts by weight per 100 parts by weight of the polyacetal resin. The amount of less than 0.001 part by weight lowers the metal corrosion inhibiting effect, and the amount exceeding 3 parts by weight causes the decomposition of polyacetal. Accordingly, both amounts are not preferred. The boric acid compound includes boric acids such as orthoboric acid, metaboric acid and tetraboric acid, and boron oxides such as diboron trioxide, and commercial products can be used.

Further, various publicly known additives can be blended with the polyacetal resin used in the present invention. They include, for example, inorganic and organic compounds such as releasing agents, nuclear agents, colorants, antistatic agents and surfactants, or various polymers. Publicly known inorganic, organic and metalic, fibrous, tabular and powder/particular fillers can be blended alone or in combination of two or more kinds thereof as long as the performance of the molded article which is intended in the present invention is not deteriorated to a large extent. Examples of such inorganic fillers include glass fiber, potassium titanate fiber, glass beads, talc, mica, white mica, wollastonite and calcium carbonate, but the fillers shall not be restricted to them.

A method for preparing the composition of the present invention shall not specifically be restricted, and the composition of the present invention can readily be prepared by publicly known facilities and methods usually used as a conventional method for preparing a resin composition. There can be used any of, for example, i) a method in which respective components are mixed and then kneaded and extruded by means of an extruder to prepare pellets, followed by molding, ii) a method in which pellets having different compositions are once prepared, and the pellets are blended in prescribed amounts and molded to obtain a molded article having an intended composition, and iii) a method in which at least one of respective components is charged directly into a molding machine. Further, a method in which a part of resin components is pulverized into fine powder and is mixed with the other components is preferred for blending homogeneously these components.

The resin composition according to the present invention can be molded by any of extrusion molding, injection molding, compression molding, vacuum molding, blow molding and foaming.

The present invention can provide the polyacetal composition having an excellent corrosion inhibiting effect on metals, particularly magnetic materials, and structural parts for a magnetic tape cassette such as a reel hub and a tape guide having a controlled adverse effect on a magnetic tape can be obtained.

EXAMPLES

The present invention shall more specifically be explained below with reference to examples but the present invention shall not be restricted to these examples.

Examples 1 to 8

As shown in Table 1, a polyacetal resin as the component (A), various hindered phenol antioxidants as the component (B), various nitrogen-containing compounds as the component (C) and various boric acid compounds as the component (D) were blended in the prescribed proportions and molten and kneaded with an extruder to prepare pelletized compositions. Subsequently, test pieces were prepared by injection molding to carry out a tape discoloration test. The results thereof are shown in Table 1. Tape discoloration was determined by the following method:

1) a box-type molded article (length: 12 mm, width: 10 mm, height: 6 mm, thickness: 2 mm) was prepared by injection molding, 2) the molded article was put on a magnetic tape (Hi8ME60 manufactured by TDK), 3) it was left for standing for 15 days under conditions of 60° C. and 95% RH, and 4) the degree of discoloration on the surface of the tape was evaluated according to the following judge criteria:
⊚: no discoloration on the tape surface
○: slight discoloration on the tape surface
Δ: a little discoloration on the tape surface
X: discoloration on the tape surface
XX: remarkable discoloration on the tape surface Comparative Examples 1 to 7

Pelletized compositions for comparison were prepared in the same manner as in the examples described above, except that only the polyacetal resin was added (Comparative Example 1); the boric acid compound as the component (D) was removed (Comparative Examples 2 to 4); the nitrogen-containing compound as the component (C) was removed (Comparative Examples 5 and 6); and the antioxidant as the component (B) was removed (Comparative Example 7). The tape discoloration test was carried out, and the results thereof are shown in Table 1.

(D) 0.001 to 3 parts by weight of a boric acid compound which is at least one selected from the group consisting of orthoboric acid, metaboric acid, tetraboric acid and boron oxides.

2. The component part of claim 1, wherein said antioxidant component (B) is a hindered phenol antioxidant.

3. The component part of claim 1, wherein said antioxidant component (B) is present in an amount between 0.05 to 2 parts by weight.

4. The component part of claim 1 or 3, wherein said nitrogen-containing compound (C) is present in an amount between 0.01 to 2 parts by weight.

5. The component part of claim 4, wherein said nitrogen-containing compound (C) is melamine, a melamine-formaldehyde resin or nylon-6.

6. The component part of claim 5, wherein said boric compound (D) is orthoboric acid or metaboric acid.

7. A component part of a magnetic tape cassette molded from a polyacetal composition which exhibits a corrosion-

TABLE 1

| Composition | Unit | Example |  |  |  |  |  |  |  |
|---|---|---|---|---|---|---|---|---|---|
|  |  | 1 | 2 | 3 | 4 | 5 | 6 | 7 | 8 |
| (A) Polyacetal | weight parts | 100 | 100 | 100 | 100 | 100 | 100 | 100 | 100 |
| (B-1) Hindered phenol antioxidant-1 | weight parts | 0.2 | 0.5 | 0.5 | 0.5 |  | 0.5 | 0.5 | 0.5 |
| (B-2) Hindered phenol antioxidant-2 | weight parts |  |  |  |  | 0.5 |  |  |  |
| (C-1) Melamine | weight parts | 0.1 | 0.1 | 0.3 | 0.3 | 0.3 |  |  | 0.3 |
| (C-2) Melamine-formaldehyde resin | weight parts |  |  |  |  |  | 0.3 |  |  |
| (C-3) Nylon 6 | weight parts |  |  |  |  |  |  | 0.3 |  |
| (D-1) Orthoboric acid | weight parts | 0.01 | 0.01 | 0.01 | 0.05 | 0.05 | 0.05 | 0.05 |  |
| (D-2) Metaboric acid | weight parts |  |  |  |  |  |  |  | 0.05 |
| Tape discoloration test result | — | ○ | ○ | ○ | ⊚ | ⊚ | ⊚ | ⊚ | ⊚ |

| Composition | Unit | Comparative Example |  |  |  |  |  |  |
|---|---|---|---|---|---|---|---|---|
|  |  | 1 | 2 | 3 | 4 | 5 | 6 | 7 |
| (A) Polyacetal | weight parts | 100 | 100 | 100 | 100 | 100 | 100 | 100 |
| (B-1) Hindered phenol antioxidant-1 | weight parts |  | 0.2 | 0.5 | 0.5 | 0.5 | 0.5 |  |
| (B-2) Hindered phenol antioxidant-2 | weight parts |  |  |  |  |  |  |  |
| (C-1) Melamine | weight parts |  | 0.1 | 0.1 | 0.3 |  |  | 0.3 |
| (C-2) Melamine-formaldehyde resin | weight parts |  |  |  |  |  |  |  |
| (C-3) Nylon 6 | weight parts |  |  |  |  |  |  |  |
| (D-1) Orthoboric acid | weight parts |  |  |  |  | 0.01 | 0.05 | 0.01 |
| (D-2) Metaboric acid | weight parts |  |  |  |  |  |  |  |
| Tape discoloration test result | — | XX | X | X | X | Δ | Δ | Δ |

(B-1): pentaerythritol tetrakis[3-(3,5-di-t-butyl-4-hydroxyphenyl)propionate]
(B-2): 1,6-hexanediol bis[3-(3,5-di-t-butyl-4-hydroxyphenyl)propionate]

What is claimed is:

1. A component part of a magnetic tape cassette molded from a polyacetal resin composition which exhibits corrosion-inhibiting effect on ferromagnetic metal tape surfaces comprising:
(A) 100 parts by weight of a polyacetal resin,
(B) 0.05 to 5 parts by weight of an antioxidant compound,
(C) 0.001 to 5 parts by weight of at least one nitrogen-containing compound selected from the group consisting of melamine and derivatives thereof, melamine-formaldehyde resin, polyamides, and polyacrylamides, and inhibiting effect on ferromagnetic metal tape surfaces, said polyacetal composition consisting essentially of a melt-blend of:
(A) 100 parts by weight of a polyacetal resin,
(B) 0.05 to 5 parts by weight of an antioxidant compound,
(C) 0.001 to 5 parts by weight of a melamine-formaldehyde resin, and
(D) 0.001 to 3 parts by weight of a boric acid compound which is at least one selected from the group consisting of orthoboric acid and metaboric acid.

* * * * *